(No Model.)

P. N. DIXON.
Drilling Device.

No. 238,032.   Patented Feb. 22, 1881.

WITNESSES:
A. Schehl.
C. Sedgwick

INVENTOR:
P. N. Dixon
BY Munn &Co
ATTORNEYS.

N. PETERS, PHOTO-LITHOGRAPHER, WASHINGTON, D. C.

UNITED STATES PATENT OFFICE.

PEARLY N. DIXON, OF CAHOKA, MISSOURI.

DRILLING DEVICE.

SPECIFICATION forming part of Letters Patent No. 238,032, dated February 22, 1881.

Application filed August 12, 1880. (No model.)

*To all whom it may concern:*

Be it known that I, PEARLY N. DIXON, of Cahoka, in the county of Clarke and State of Missouri, have invented a new and useful Improvement in Drill-Stocks, of which the following is a specification.

Figure 1:
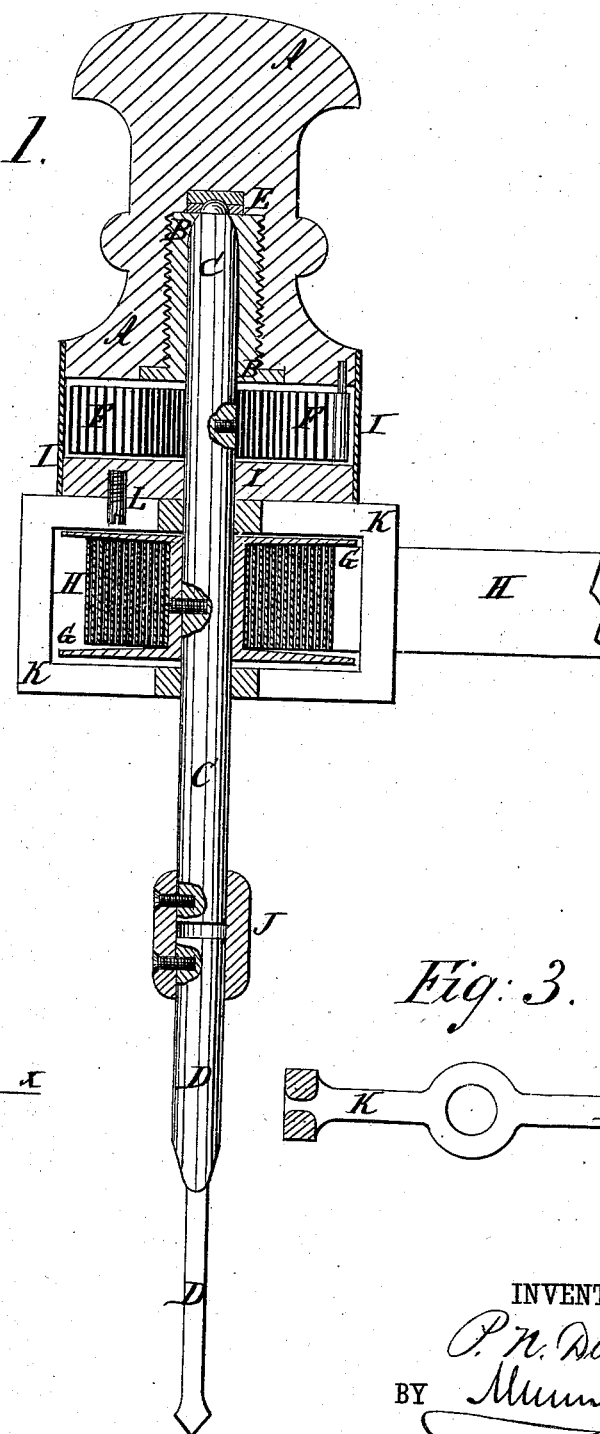
Figure 2:
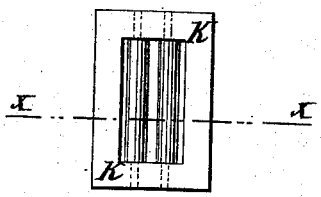
Figure 3:
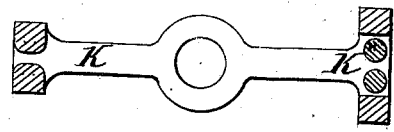

Figure 1 is a sectional elevation of the improvement. Fig. 2 is an end elevation of the ribbon-guide. Fig. 3 is a longitudinal section of the ribbon-guide, taken through the line $x$ $x$, Fig. 2.

Similar letters of reference indicate corresponding parts.

The object of this invention is to furnish stocks for hand and other drills so constructed that the drills can be easily, conveniently, and rapidly worked, and which at the same time shall be simple in construction and not liable to get out of order.

The invention consists in constructing a drill-stock of the handle having a socket and bearing, the shank that carries the drill, the coiled spring attached to the shank and the handle, the spool attached to the shank, the ribbon attached to the spool, and the case to inclose the spring, and the guide for the ribbon, whereby the drill will be rotated by alternately drawing upon and slackening the ribbon, as will be hereinafter fully described.

A represents the handle of the stock, in the lower end of which is formed a screw-hole. Into the screw-hole of the handle A is screwed a socket, B, to receive the upper end of the shank C, that carries the drill D. In the bottom of the screw-hole in the handle A, at the inner end of the screw-socket B, is placed a bearing, E, for the end of the shank C to rest against, and which is kept in place by the said socket B.

At the lower end of the handle A is placed a coiled spring, F, which is coiled around the shank C, and its inner end is secured to the said shank by a screw or other suitable means. The outer end of the coiled spring F is secured to the lower end of the handle A by a screw, a pin, or other suitable means.

To the shank C, below the coiled spring F, is secured, by a screw or other suitable means, a spool, G, to which is attached the end of a ribbon or cord, H. Upon the ends of the spool G are formed ring-flanges, to keep ribbon or cord H in place. The ribbon or cord H is coiled around the spool G in the opposite direction from the spring F, so that the said spring will be coiled by the uncoiling of the ribbon or cord H and the ribbon or cord H will be recoiled by the uncoiling of the spring F. The outer end of the ribbon or cord H passes out through a slot in the end of the guide K, which is made in the form of a rectangular frame, having holes in the center of its side bars to receive the shank C, so that the said shank will turn freely, and having slots in its end bars for the passage of the ribbon. The slots in the end bars of the guide K may be made with rounded edges, or may be provided with rollers to diminish the friction as the ribbon passes out and in. Both constructions are shown in Fig. 3. By making the shank-holes through the centers of the side bars of the guides the end parts of the said guide balance each other, so that the weight of the guide will have no tendency to draw the drill to one side while being used. The spring F is covered and protected by a case, I, screwed upon or otherwise attached to the handle A.

To the bottom of the case I is attached a screw-pin, L, which projects so far that the arms of the guide K will strike against it, so that the said guide cannot make more than a half-rotation in either direction. When it is desired to regulate the tension of the spring F the ribbon H is fully coiled, and the screw-pin L is screwed in so far that the guide K will pass it, and the guide K is turned to coil or uncoil the spring F until the said spring has received the desired tension. The screw-pin L is then turned out to its former position.

To the lower end of the shank C is secured, by a set-screw or other suitable means, a coupling, J, the lower end of which serves as a socket to receive the upper end of the drill D. The drill D is secured in the coupling J by a set-screw or other suitable fastening, which will allow the drill to be readily detached when required.

In using the improvement the point of the drill is placed upon the substance in which the hole is to be formed, and is pressed down with the hand holding the handle A. The ribbon H is then drawn out, which rotates the drill D in one direction, and as the ribbon H is slackened the drill D is rotated in the other direction by the uncoiling of the spring F. If the point of the drill is so formed as to cut in both directions, the pressure upon the handle A is continued while the drill revolves in both directions; but if the point of the drill is so formed as to cut only in one direction, the pressure is applied when the drill is revolving in that direction, and not when the drill is revolving in the other direction.

Having thus fully described my invention, I claim as new and desire to secure by Letters Patent—

1. A drill-stock constructed substantially as herein shown and described, consisting of the handle A, having socket B and bearing E, the shank C, that carries the drill D, the coiled spring F, the spool G, the ribbon H, the guide K, and the case I, as set forth.

2. In a drill-stock, the combination, with the handle A, having socket B and bearing E, and with the shank C, that carries the drill D, of the coiled spring F, the spool G, the ribbon H, the guide K, and the case I, substantially as herein shown and described, whereby the drill will be rotated by alternately drawing upon and slackening the ribbon, as set forth.

PEARLY NICHOLAS DIXON.

Witnesses:
CHARLES ANDREW KINKADE,
SPENCER LEHEW SMITH.